(12) United States Patent
Miller et al.

(10) Patent No.: US 7,660,950 B2
(45) Date of Patent: Feb. 9, 2010

(54) OUTPUT CACHE MANAGER

(75) Inventors: Patrick C. Miller, Sammamish, WA (US); David R. Quick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 11/205,588

(22) Filed: Aug. 15, 2005

(65) Prior Publication Data

US 2007/0038812 A1 Feb. 15, 2007

(51) Int. Cl.
*G06F 12/00* (2006.01)
(52) U.S. Cl. .................................................. 711/133
(58) Field of Classification Search .................. 711/133
See application file for complete search history.

(56) References Cited

U.S. PATENT DOCUMENTS

| | | | |
|---|---|---|---|
| 6,578,113 B2 * | 6/2003 | Krishnamurthy et al. .... | 711/141 |
| 2002/0004813 A1 * | 1/2002 | Agrawal et al. ............. | 709/201 |
| 2002/0010753 A1 * | 1/2002 | Matsuoka et al. ........... | 709/217 |
| 2002/0032870 A1 * | 3/2002 | Spusta et al. ................ | 713/201 |
| 2002/0188633 A1 * | 12/2002 | Davis et al. ................. | 707/513 |
| 2003/0046365 A1 * | 3/2003 | Pfister et al. ................ | 709/219 |
| 2004/0255233 A1 * | 12/2004 | Croney et al. ............... | 715/500 |
| 2006/0168125 A1 * | 7/2006 | Leo Spork .................. | 709/219 |

* cited by examiner

*Primary Examiner*—Reginald G Bragdon
*Assistant Examiner*—Aracelis Ruiz
(74) *Attorney, Agent, or Firm*—Merchant & Gould; Ryan T. Grace (57) ABSTRACT

A web page is generated by locating an area in a website to place the page and selecting a template for the page. An output cache manager allows a user to attach a cache profile in the form of metadata to the template and the area in the website. The output cache manager uses the metadata to identify the cache profile that is associated with the web page when the page is rendered. The cache profile identifies the page output directive caching parameters that are associated with a web page when the page is rendered. A cache profile may be inherited by web pages that are dependent on the site in which the page resides such that a previously established cache profile is overridden. The cache profile may be created and modified by any authorized user. Any modification to the cache profile may be applied to all web pages that are associated with the cache profile.

19 Claims, 8 Drawing Sheets

| | Name | Authorized | ACL | Duration | Personalization | Description |
|---|---|---|---|---|---|---|
| 300 | Public Internet | No | No | 5 Min. | No | For Anonymous Users |
| 310 | Collaborative Internet | Yes | Yes | 5 Hours | Yes | For Project Participants |
| 320 | Internal Internet | Yes | Yes | 1 Day | Yes | For Board of Directors |

OUTPUT CACHE MANAGER

BACKGROUND

Internet users expect websites to contain current information that is delivered quickly. Individual modification of web pages is often impractical each time content is updated due to the vast amount of information that a website may contain. Web content may be dynamically generated using Active Server Pages (ASP). When a web page is requested, a server may dynamically render the page to include information from a database to ensure that the served page contains current information. However, the rendering step may cause delays when serving pages because the dynamically generated content may be expensive to generate.

Output caching may increase serving speed when information need not be updated each time it is requested. For example, the fully rendered copy of a page may be stored inside an output cache the first time that the dynamic page is requested. The server may serve the stored copy from the output cache the next time the page is requested rather than re-rendering the page. By skipping the rendering step, output caching markedly increases the rate at which requested pages are served.

A page output directive tag describes a set of parameters associated with that individual page. For example, using different parameters of the page output directive some pages may be cached for a long duration, while others may never be cached. A server may be instructed to either render a new page or to serve a previously cached page based on the directive tag associated with the page and the state of the page in the output cache. Each output directive tags may define a different caching policy. For example, each page in a website might define it's own page output directive parameters. However, modifying the page output cache directive associated with individual web pages can be laborious in a large website.

SUMMARY

A web page is generated by locating an area in a website to place the page and selecting a template for the page. Templates are created and maintained by template designers, and sites are created and maintained by site administrators. An output cache manager allows a user to attach a cache profile in the form of metadata to the template and the area in the website. The output cache manager uses the metadata to identify the cache profile that is associated with the web page when the page is rendered. The cache profile defines page output directive caching parameters that are associated with a web page when the page is rendered. A cache policy determines which cache profile to apply. The cache policy also enables a delegated administrator or site manager to set the desired cache profile for a given page layout or site depending on how a central administrator has set the cache policy at the root or topmost site of the website.

A cache profile may be inherited by web pages that are dependent on the site in which the page resides such that a previously established cache profile is overridden. The cache profile may be created and modified by any authorized user. Any modification to the cache profile may be applied to all web pages that are associated with the cache profile.

A user requests a web page from a client while navigating the web using a browser. The requested web page is searched for in the output cache by matching caching parameters in the cache profile associated with the requested page to caching parameters identified in cache keys stored in the output cache. If the web page is stored in the output cache and the web page is valid the page is retuned to the client from the cache. The web page may not be valid because, for example, a change occurred to a corresponding website after the web page was cached. If the web page is not stored in the cache or if the web page is no longer valid, the web page is rendered from a server. The cache profile associated with the rendered page is located. A cache key is generated by establishing cache parameters for the rendered page. The web page is then stored in the output cache along with the cache key. The next time that the user requests the same page, the web page may be retrieved from the output cache if the web page is still valid.

Other aspects of the invention include system and computer-readable media for performing these methods. The above summary of the present disclosure is not intended to describe every implementation of the present disclosure. The figures and the detailed description that follow more particularly exemplify these implementations.

DETAILED DESCRIPTION

A web page is generated by locating an area in a website to place the page and selecting a template for the page. An output cache manager allows a user to attach a cache profile in the form of metadata to the template and the area in the website. The output cache manager uses the metadata to identify the cache profile that is associated with the web page when the page is rendered. The cache profile defines page output directive caching parameters that are associated with the web page when the page is rendered. A cache profile may be inherited by web pages that are dependent on the site in which the page resides such that a previously established cache profile is overridden. The cache profile may be created and modified by any authorized user. Any modification to the cache profile may be applied to all web pages that are associated with the cache profile.

Embodiments of the present invention are described in detail with reference to the drawings, where like reference numerals represent like parts and assemblies throughout the several views. Reference to various embodiments does not limit the scope of the disclosure, which is limited only by the scope of the claims attached hereto. The examples set forth in this specification are not intended to be limiting and merely set forth some of the many possible embodiments. The following detailed description is, therefore, not to be taken in a limiting sense.

Illustrative Operating Environment

Figure 1:
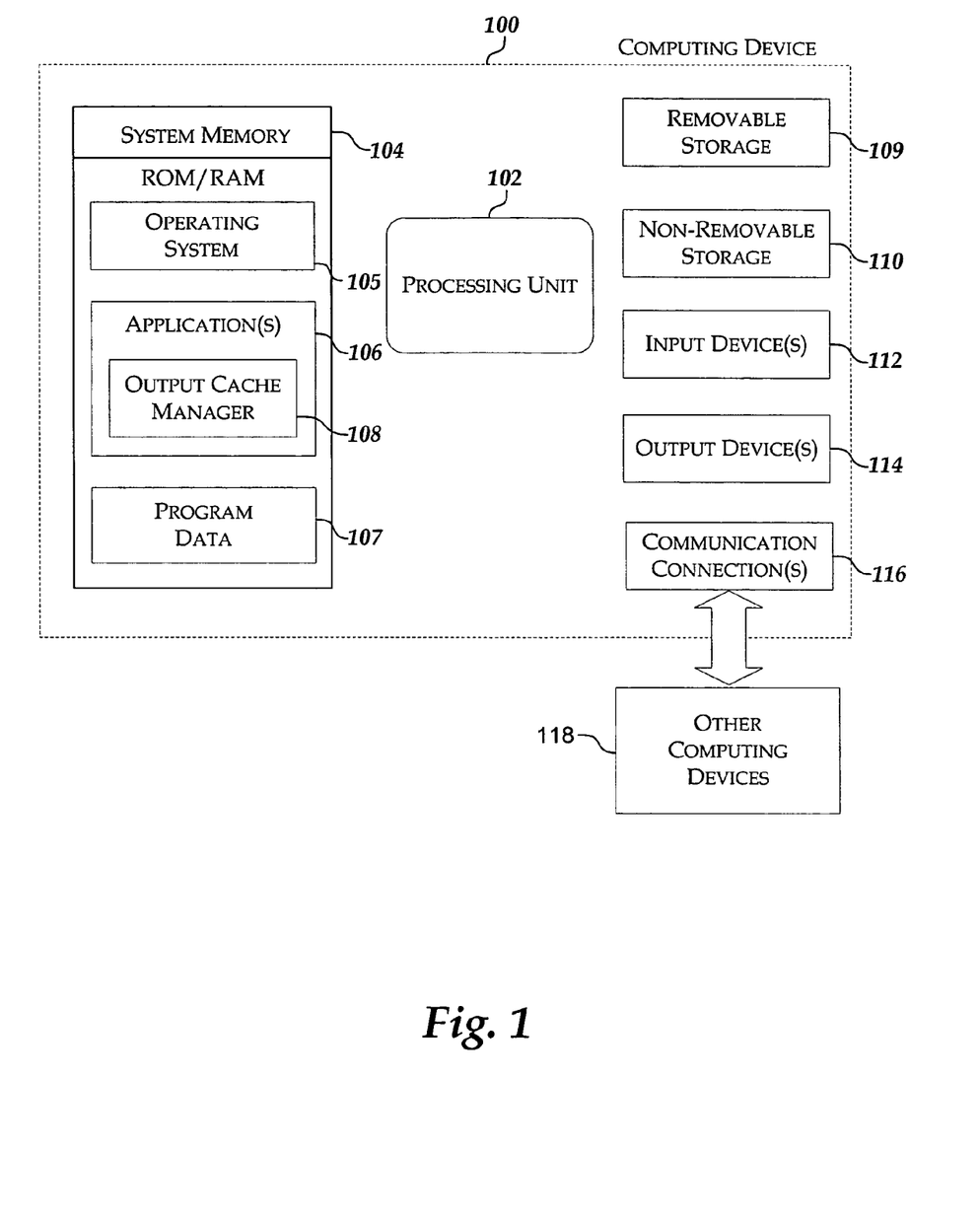
FIG. 1 is a functional block diagram illustrating an exemplary computing device that may be used in one aspect of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include output cache manager 108 that is discussed in further detail below.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Output Cache Manager

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

The example operating environment is described in the context of client and server computing devices that communicate content (e.g., web pages) over a communication medium such as an internet, intranet, or some other network connection topology. The terms "client" and "server" refer to one instance of the method. However, the same device may play both a "client" and a "server" role in different instances.

Figure 2:
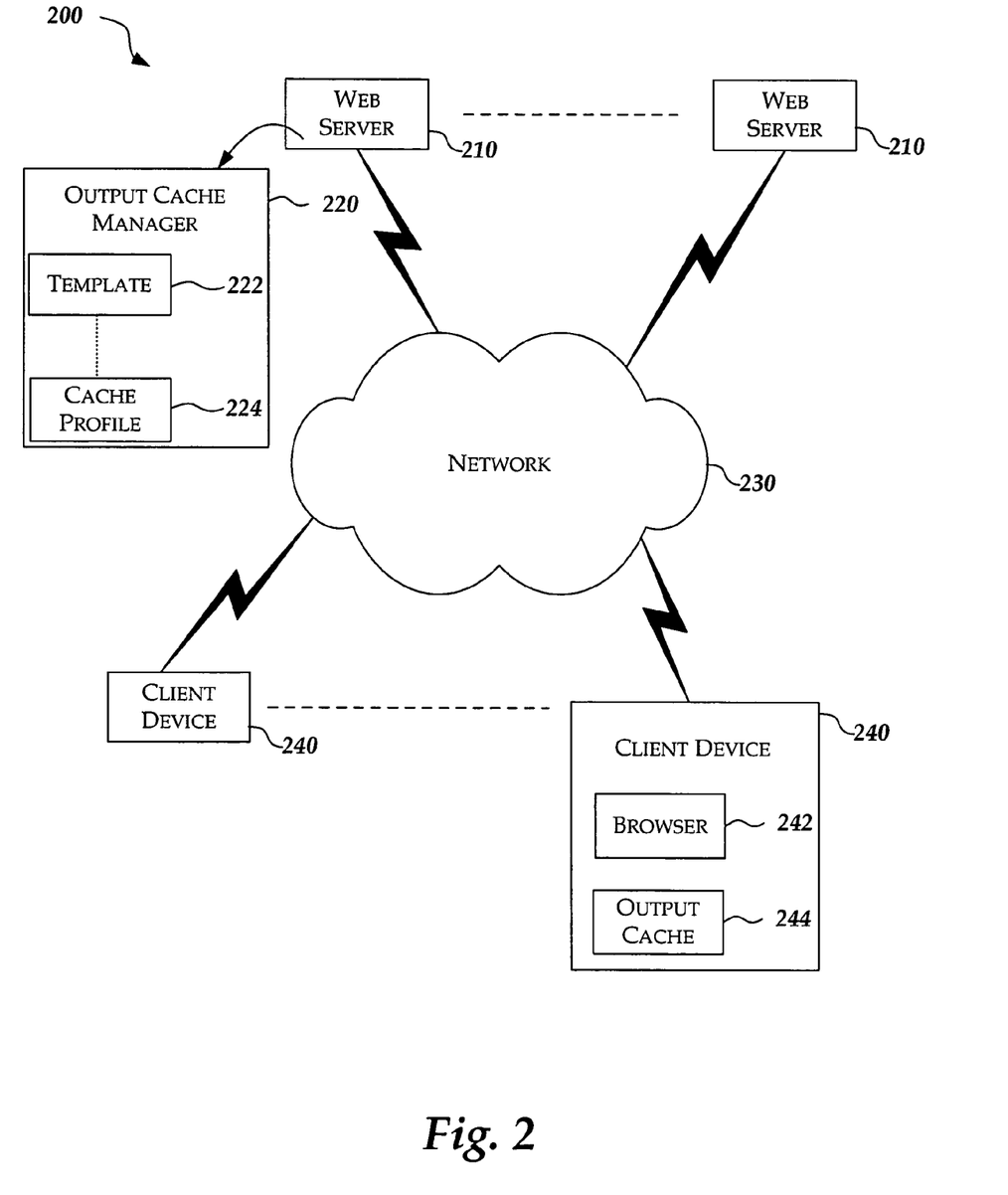
FIG. 2 is a functional block diagram illustrating an exemplary system for managing an output cache.

FIG. 2 is a functional block diagram illustrating an exemplary system for managing an output cache. The system 200 includes one or more server devices 210, output cache manager 220, network 230, and one or more client devices 240. Server device 210 communicates with output cache manager 220 to manage content requested by client device 240. Output cache manager 220 includes templates, such as template 222, and cache profiles, such as cache profile 224. Client device 240 includes browser 242 and output cache 244. A user may navigate a website at browser 242. A web page is requested from client device 240. Server device 210 renders the requested web page using template 222 and cache profile 224. The rendered web page is then returned to browser 242 for user access.

A template defines the layout associated with a web page. A template may be associated with at least one cache profile. The cache profile defines page output caching parameters that are associated with a web page when the page is rendered. The cache profile includes metadata that is associated with the template and the location where the web page exists in a website hierarchy. The cache profile is included with website metadata such that cache profile may be modified by changing the metadata properties for the template. Thus, the cache profile may be easily accessed and modified from the website without directly accessing the template. Since the template need not be opened to effect a change in the cache profile, there is no risk of generating a code error in the template that executes the website. A modification may be made to a cache profile and the modification is easily applied across the entire website where the corresponding template is used. Different cache profiles may also be easily applied to different areas of the website.

In one embodiment, a cache profile may be applied to one web page in a website. In another embodiment, a cache profile may be applied to several different web pages in one area of a website. In yet another embodiment, a cache profile may be applied to an entire website. A cache profile for an entire website may indicate that the content is not to be stored in the output cache. Likewise, a cache profile for an entire website may be arranged to allow output caching of all web pages on the site for a predetermined time duration (e.g., ten minutes) before clearing the cache. The output cache for the entire website may be enabled or disabled by a master on/off switch. However, a cache profile applied to an entire website may be overridden. A top-level control may allow or prevent a template or an area of the web site to define a cache profile. For example, a site administrator may override a cache profile associated with the entire website by associating a subsite within the website with a different cache profile (e.g., all of the content on the subsite may be stored in the output cache for thirty seconds before the cache is cleared). Thus, the caching parameters of all the web pages on a website may be easily controlled using cache profiles.

Figure 3:
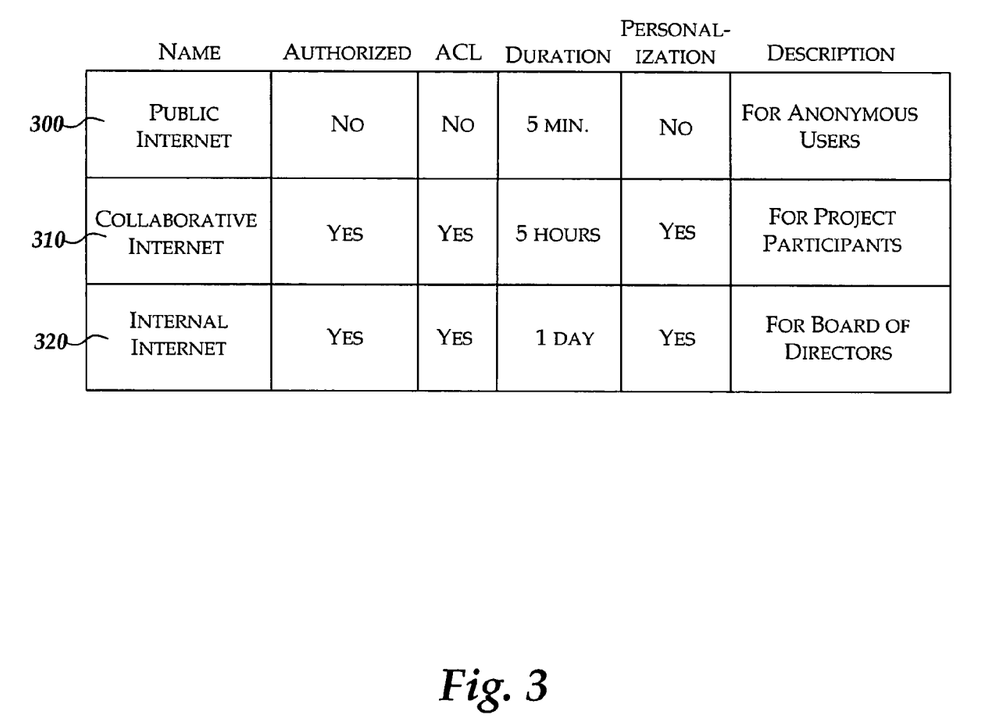
FIG. 3 illustrates example cache profiles, in accordance with one aspect of the invention.

FIG. 3 illustrates example cache profiles, such as public internet cache profile 300, collaborative internet cache profile 310, and internal internet cache profile 320. Each cache profile establishes different caching parameters to be associated with a web page. Example caching parameters include:

authorization, an access control list (ACL), duration, and personalization. ACL establishes effective system rights. Personalization refers to content that is specific to the requesting user. For example, a template may include personalized information (e.g., the last 5 items purchased by the requesting user).

Authorization refers to users who are authorized to access the web page. The users may be anonymous or authenticated. The behavior of a website is relatively static for anonymous users. Anonymous users generally have access to the same information without any personalized content. Anonymous users share the same rights across the entire web site. An anonymous user usually does not have the ability to create or change content. The majority of visitors to a public web site are often anonymous users. Authenticated users are often provided with different views of the content. For example, a human resources department user may have access to a list of potential layoffs. The list would not be made available to other authenticated users who are not authorized to view such information.

Duration identifies the period of time that the web page is stored in the cache before the web page is considered invalid and cleared from the cache. When a web page is modified (e.g., content is added or removed), the modification should be made available to subsequent users who access the page. Sometimes, it is not necessary for the modification to be made available immediately. For example, it may be sufficient for the modified content to be accessible five minutes or one day after the change is made. The content may be static and unlikely to change within the defined duration. Even if the content does change, the change may be inconsequential because the page is not rendered during the established duration.

Public internet cache profile 300 may be associated with anonymous users. Anonymous users do not have any system rights so an ACL rights check is not performed. A web page is stored in the output cache for a five minute duration before being cleared from the cache. Public internet cache profile 300 does not allow personalization for anonymous users. A description may also be provided with public internet cache profile 300 to indicate the purpose of the cache profile. In one embodiment, the description may be seen on a user interface or a drop down menu to inform a user that the cache profile applies to anonymous users. The description may be useful when selecting a cache profile for a template because the user may not be familiar with the meaning or significance of the different caching parameters.

Collaborative internet cache profile 310 and internal internet cache profile 320 may be associated with users who share a network. The users may share a network because they are collaborating on a project or because they are members of an exclusive group (e.g., a board of corporate directors). Collaborative cache profile 310 and internal internet cache profile 320 both authorize authenticated users. Unauthorized users are not provided access to a web page associated with the cache profile. An ACL rights check is performed to determine the level of access granted to the user. Each web page associated with collaborative internet cache profile 310 and internal internet cache profile 320 is stored in the output cache for the specified duration before being cleared from the cache. Personalization is enabled for collaborative internet cache profile 310 and internal internet cache profile 320 to provide each authorized user with personalized content.

Figure 4:
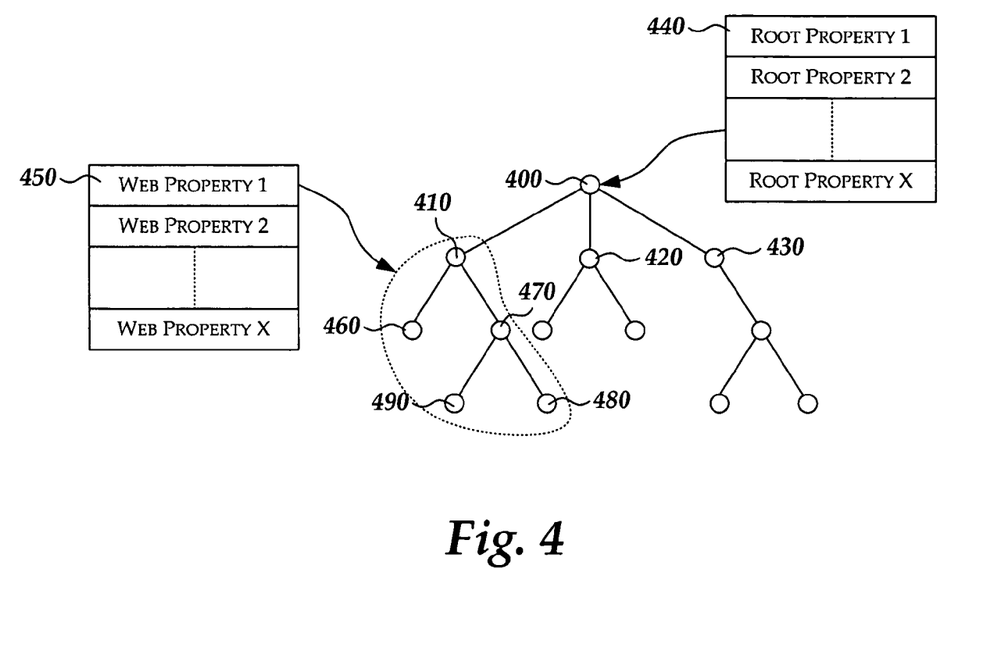
FIG. 4 illustrates a hierarchical structure of web pages of a website.

FIG. 4 illustrates a hierarchical structure of web pages of a website. Each web page is identified as a node in the hierarchical structure. For example, a top-level node, such as node 400, may symbolize a home page of a website. Second-level nodes, such as nodes 410, 420, 430, symbolize web pages that may be navigated from the home page.

Node 400 is associated with root profile 440. Root profile 440 includes root properties. The root properties may identify an order of precedence for the hierarchy of web pages on the website. For example, root property 1 may identify if any cache profiles associated with areas or individual web pages on the website are overridden. In another example, root property 2 may identify if a user is authorized to access a particular area within the website.

When a web page is rendered, a determination is made as to where the web page lies in the website hierarchy. The web page's location in the hierarchy identifies a template associated with the web page. The root properties associated with the template are identified in a corresponding cache profile. The root properties may establish default caching parameters for the rendered web page. For example, the root properties may establish that only individual web pages can override the root properties. The root properties may also enable output caching and establish an output cache storage duration.

The user may access the cache profile associated with the template of the rendered web page to modify any caching parameters. For example, node 410 may symbolize the rendered web page. The rendered page may be associated with cache profile 450. The user may change the caching parameters in cache profile 450 such that the cache parameters identified in root profile 440 are overridden with regard to node 410 (e.g., web property 1 and web property 2 are applied in place of root property 1 and root property 2). For example, the user may disable output caching for node 410, allow anonymous users to access node 410, decrease the output cache storage duration, etc. Thus, a new cache profile may be associated with the web page symbolized by node 410. In one embodiment, cache profile 450 may be associated with nodes that are dependent on node 410, such as nodes 460, 470, 480, 490. Thus, cache profile modifications made to one page may also be easily applied to other dependent web pages.

Figure 5:
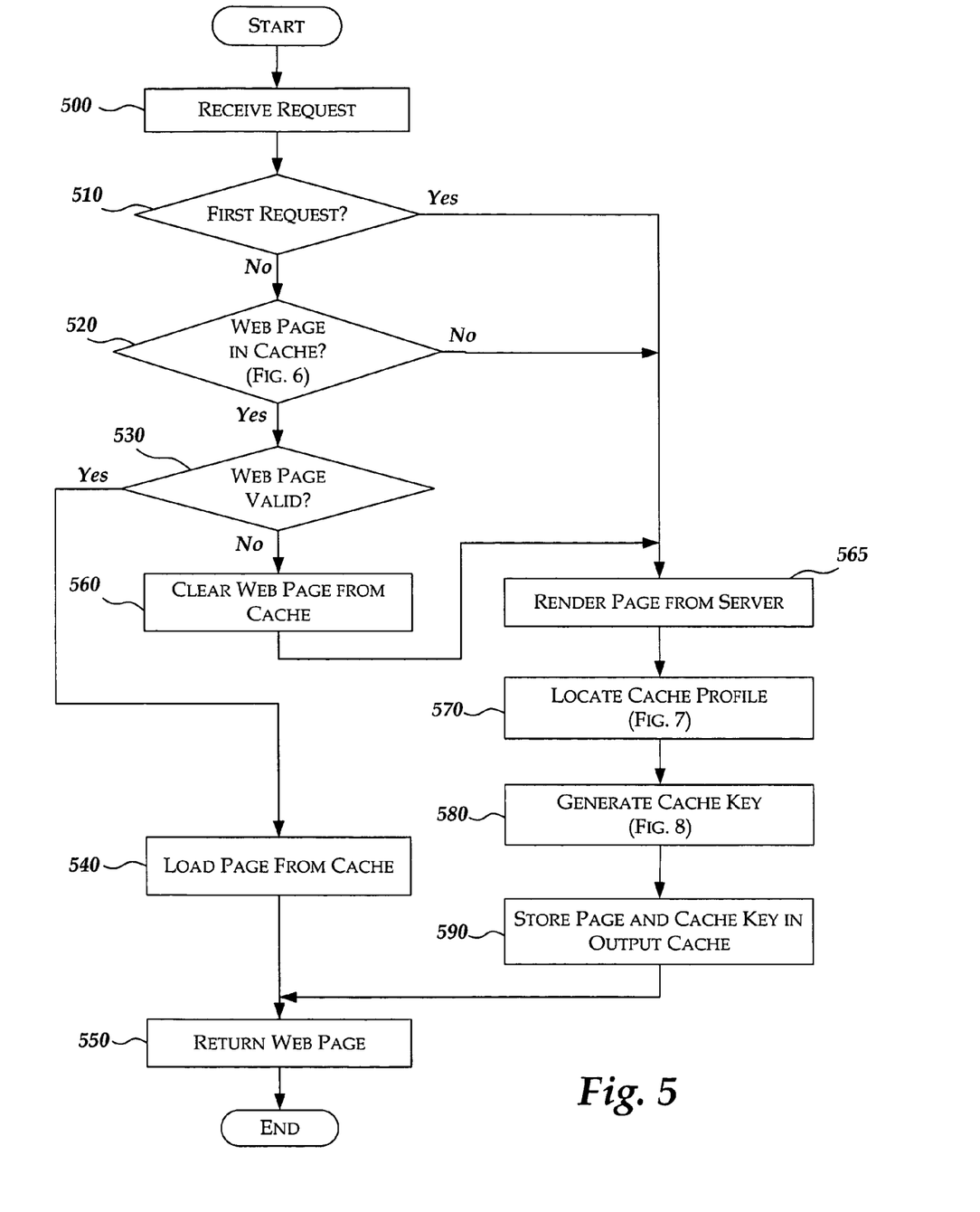
FIG. 5 is an operational flow diagram illustrating a process for managing an output cache.

FIG. 5 is an operational flow diagram illustrating a process for managing an output cache. Processing begins at a start block where a user is navigating a network. The user may be navigating the internet using a web browser on a client device. The client device requests a web page using a browser at block 500.

Moving to decision block 510, a determination is made whether the request for the web page is the first time that the web page has been requested by the client device. If the request is a first request, then processing continues at block 565. If the request is not the first request, processing moves to decision block 520.

Transitioning to decision block 520, a determination is made whether the requested web page is stored in the output cache. The process for determining whether the requested web page is stored in the output cache involves locating a matching cache key in the output cache that is associated with the requested web page, which is described in detail with reference to FIG. 6. If the requested web page is not stored in the output cache, processing continues at block 565. If the requested web page is stored in the output cache, processing moves to decision block 530.

Proceeding to decision block 530, a determination is made whether the web page located in the output cache is valid. The web page may be invalid for a number of reasons such that the cached web page should not be returned to the client device. For example, the web page may be invalid because content associated with the web page has changed (e.g., a write has occurred on the website such that a web page has been deleted, a web page has been modified, something to be rendered has changed on the web page or on any associated web pages, etc.). If the write occurred after the web page was cached, then the web page is invalid. In another example, the web page may be invalid because the page has been stored in the output cache longer than the duration set forth in the cache profile.

If the web page is valid, processing continues at block 540 where the web page is loaded from the output cache. Continuing to block 550, the web page is returned to the requesting client for display on the browser without rendering the web page from a server. Processing then terminates at an end block. If the web page is not valid, the web page is cleared from the output cache at block 560.

Processing continues at block 565, where the requested web page is rendered from a server. The web page is rendered from the server when the web page is requested a first time, the web page is not in the output cache, or the web page in the output cache is invalid. Moving to block 570, a cache profile is located. The process for locating the cache profile is described in detail with reference to FIG. 7.

Transitioning to block 580, a cache key is generated for the web page. The cache key identifies different caching parameters associated with the web page. The process for generating the cache profile is described in detail with reference to FIG. 8.

Proceeding to block 590, the requested web page and the cache key are stored in the output cache. Processing continues to block 550 where the rendered web page is returned to the client device. The user may then access the web page from the browser. Processing then terminates at the end block.

Figure 6:
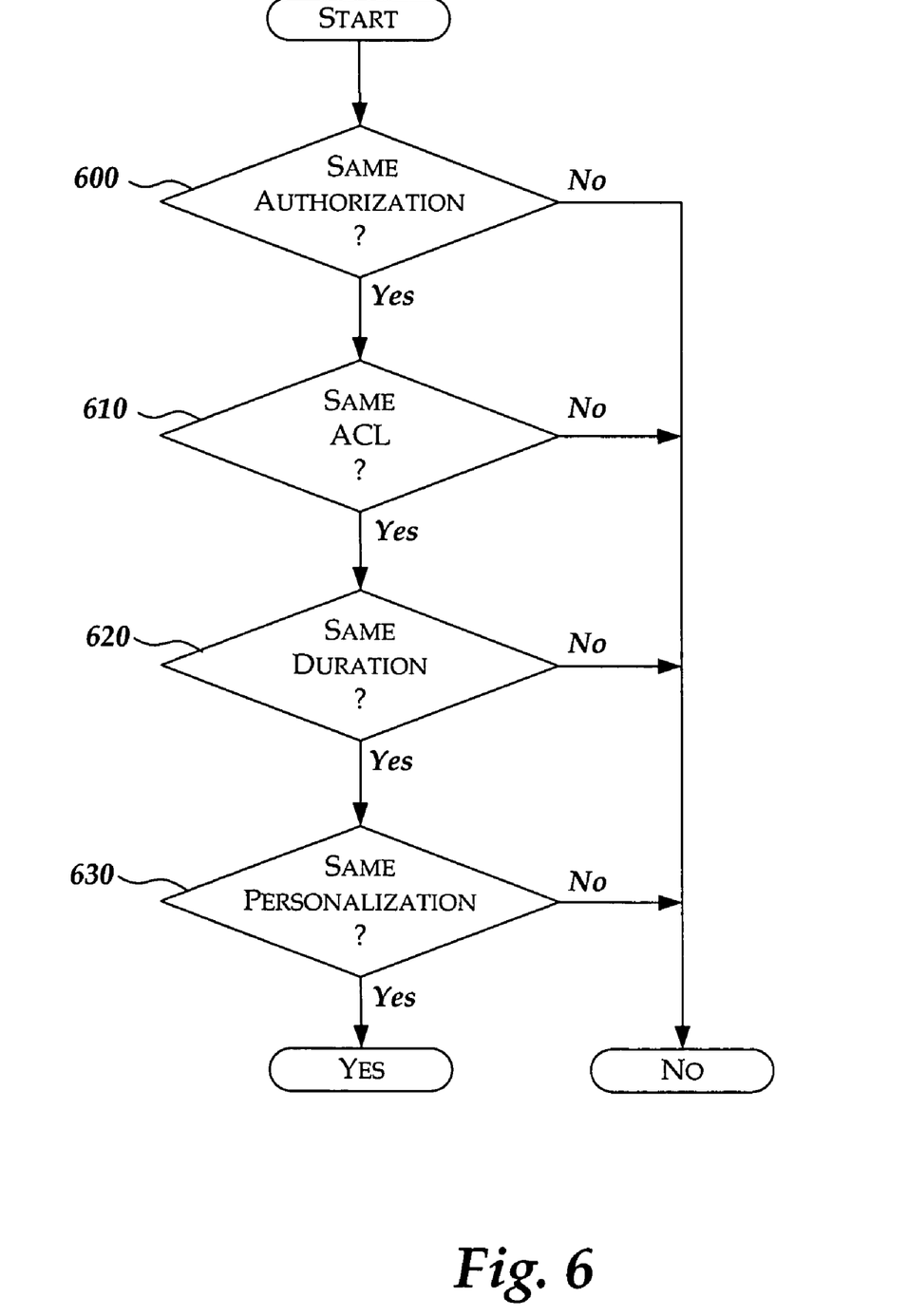
FIG. 6 is an operational flow diagram illustrating a process for determining whether the requested web page is stored in the output cache.

FIG. 6 is an operational flow diagram illustrating a process for determining whether the requested web page is stored in the output cache. Processing begins at a start block where strings are associated with a cache profile to uniquely identify the cache profile. The strings are used to locate a matching cache key in the output cache such that the requested web page may be located. Each string may be associated with a caching parameter defined in the cache profile. The cache key is located by matching the caching parameters to the cache profile of the requested page.

Moving to decision block 600, a determination is made whether a cache key exists in the output cache that includes the same authorization as the requested page. Authorization refers to whether the user is anonymous or authenticated. If a cache key exists in the output cache that includes the same authorization as the requested page, processing continues at decision block 610. If a cache key does not exist in the output cache that includes the same authorization as the requested page, then a matching cache key is not present in the output cache.

Transitioning to decision block 610, a determination is made whether a cache key exists in the output cache that includes the same ACL rights as the requested page. ACL rights refer to the level of content access that a user is granted. If a cache key exists in the output cache that includes the same ACL rights as the requested page, processing continues at decision block 620. If a cache key does not exist in the output cache that includes the same ACL rights as the requested page, then a matching cache key is not present in the output cache.

Proceeding to decision block 620, a determination is made whether a cache key exists in the output cache that includes the same time duration for storing the web page in the output cache as the requested page. After the time duration expires, the web page is considered invalid and may be cleared from the output cache. If a cache key exists in the output cache that includes the same time duration for storing the web page in the output cache as the requested page, processing continues at decision block 630. If a cache key does not exist in the output cache that includes the same time duration for storing the web page in the output cache as the requested page, then a matching cache key is not present in the output cache.

Advancing to decision block 630, a determination is made whether a cache key exists in the output cache that includes the same personalization settings as the requested page. Personalization settings allow a user to be presented with personalized content specific to the user. If a cache key exists in the output cache that includes the same personalization settings as the requested page, then a proper cache key is present in the output cache. If a cache key does not exist in the output cache that includes the same personalization settings as the requested page, then a proper cache key is not present in the output cache. Processing then terminates.

Figure 7:
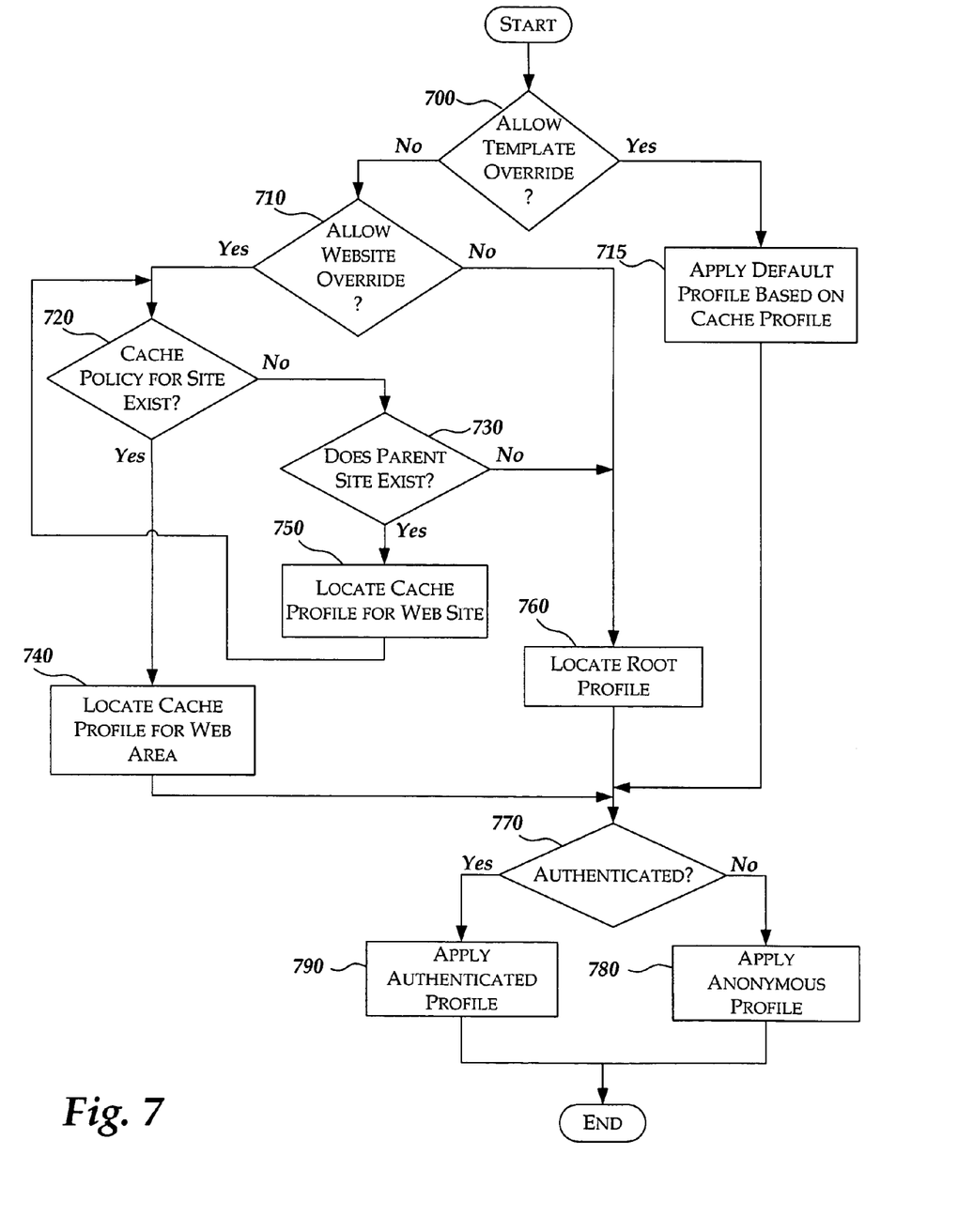
FIG. 7 is an operational flow diagram illustrating a process for locating a cache profile.

FIG. 7 is an operational flow diagram illustrating a process for locating a cache profile. Processing begins at a start block where a website includes a hierarchy of different web pages. A root profile establishes default caching parameters that may be applied to an entire website or to a portion of the website (e.g., one or more web pages in an area of the website). After a web page is rendered from a server device, the cache profile associated with the web page is located.

A determination is made whether the root properties associated with the rendered web page allow a template to override a root profile at decision block 700. If a template override is not allowed, processing continues at decision block 710. If a template override is allowed, processing proceeds to block 715 where a default profile is applied to the template. The default profile is based on the cache profile. Processing then proceeds to decision block 770.

Moving to decision block 710, a determination is made whether the root properties associated with the rendered web page allow the website to override a root profile. If a website override is allowed, processing continues at decision block 720. If a website override is not allowed, processing proceeds to decision block 730.

Transitioning to decision block 720, a determination is made whether a cache policy for the website exists. If a cache policy does not exist, processing continues at decision block 730. If a cache policy exists, processing proceeds to block 740 where a cache profile for a web area is located. The cache profile may be referenced in a template associated with the rendered web page. Processing then continues at decision block 770.

Continuing to decision block 730, a determination is made whether a parent site exists. If a parent site does not exist, processing continues at block 760. If a parent site exists, processing continues at block 750 where a cache profile for the web site is located. Processing then continues at block 720.

Advancing to block 760, a root profile associated with the rendered web page is located. The root profile may be referenced in a template associated with the rendered web page. The root profile includes root properties. The root properties identify an order of precedence for individual web pages of the website. The root properties may identify if any cache profiles associated with areas or individual pages on the website may be overridden. The root properties may also identify if a user is authorized to access a particular web page or area within the website.

Proceeding to decision block 770, a determination is made whether the user is authenticated. If the user is not authenticated (e.g., the user is anonymous), processing continues to block 780 where a default anonymous profile is applied to the web page. If the user is authenticated, processing proceeds to block 790 where a default authenticated profile is applied to the web page. Processing then terminates at an end block.

Figure 8:
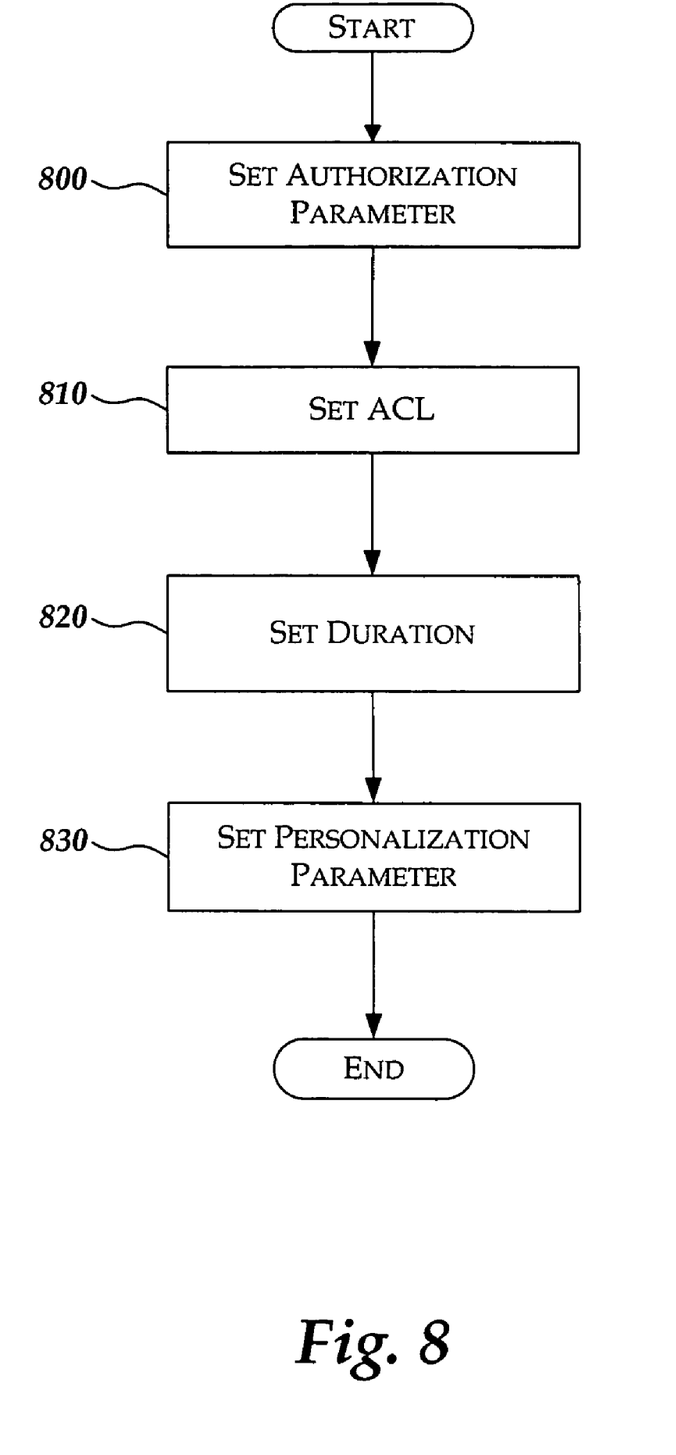
FIG. 8 is an operational flow diagram illustrating a process for generating a cache key.

FIG. 8 is an operational flow diagram illustrating a process for generating a cache key for a web page. A user may generate the cache key to establish caching parameters to be associated with the web page. Processing begins at a start block where the web page is rendered from a server, and the cache profile associated with the web page is located.

An authorization parameter is set for the web page at block 800. The authorization parameter establishes what type of users may access content. The users may be anonymous or authenticated. Anonymous users generally have access to the same information. Authenticated users are often provided with different views of content.

Moving to block 810, ACL rights are established for the web page. ACL rights identify the rights that apply to a user when accessing content. Anonymous users usually share the same basic rights across a website.

Transitioning to block 820, the duration of time that the web page is stored in the output cache is established. When the duration expires, the web page is considered invalid and may be cleared from the output cache.

Proceeding to block 830, a personalization parameter is enabled or disabled for the web page. Personalization may not apply to anonymous users. Authenticated users may or may not be provided with personalized content. Processing then terminates at an end block.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for managing an output cache, comprising:
    receiving a request for a web page associated with a website;
    determining a cache profile, wherein the cache profile is separately stored from a web page template of a web page and linked to the web page template via metadata of the cache profile, wherein the cache profile is determined based on the web page hierarchical level location within a website hierarchy of the website, wherein cache parameters of the cache profile and the link between the cache profile and the web page template are modifiable without accessing the web page template;
    determining whether the web page is stored in the output cache based on the cache profile;
    determining whether the web page is valid when the web page is stored in the output cache;
    returning the web page from the output cache when the web page is stored in the output cache and the web page is valid;
    rendering the web page from a server when the web page is not stored in the output cache; and
    rendering the web page from the server when the web page is not valid.

2. The computer-implemented method of claim 1, wherein determining whether the web page is stored in the output cache further comprises matching the cache parameters of the cache profile associated with the requested web page to caching parameters identified in a cache key stored in the output cache.

3. The computer-implemented method of claim 1, further comprising:
    generating a cache key for the rendered web page, wherein the cache key identifies caching parameters for the rendered web page; and
    storing the rendered web page and the cache key in the output cache.

4. The computer-implemented method of claim 1, wherein determining whether the web page is valid comprises determining whether the web page was modified after the web page was stored in the output cache.

5. The computer-implemented method of claim 1, wherein determining whether the web page is valid comprises determining whether the web page was stored in the output cache longer than a predetermined time duration.

6. The computer-implemented method of claim 1, further comprising clearing the web page from the output cache when the web page is not valid.

7. The computer-implemented method of claim 1, wherein the caching parameters include an access control list that associates members of the access control list with parameters.

8. The computer-implemented method of claim 1, further comprising automatically associating the cache profile with another web page having a same website hierarchical level as the website hierarchical level of the requested web page.

9. The computer-implemented method of claim 1, further comprising disabling output caching for a website that includes the web page.

10. The computer-implemented method of claim 1, further comprising overriding the cache profile by a cache profile associated with a web page having a higher website hierarchical level as the requested web page.

11. The computer-implemented method of claim 1, further comprising modifying the cache profile, applying the modified cache profile to the web page template of the requested web page, and automatically applying the modified cache profile to other web pages of the website having a same website hierarchical level as the website hierarchical level of the requested web page.

12. A system for managing an output cache, comprising:
    a client comprising a browser and the output cache, wherein a request for a web page associated with a website is received at the browser;
    a server coupled to the client, wherein:
    the server is arranged to determine a cache profile, wherein the cache profile is separately stored from a web page template of a web page and linked to the web page template via metadata of the cache profile, wherein the cache profile is determined based on the web page hierarchical level location within a website hierarchy of the website, wherein cache parameters of the cache profile and the link between the cache profile and the web page template are modifiable without accessing the web page template, and
    an output cache manager coupled to the server and the client, wherein the output cache manager is arranged to:
    locate the template and the cache profile,
    determine whether the web page is stored in the output cache based on the cache profile,
    determine whether the web page is valid when the web page is stored in the output cache, and
    return the web page to the browser from the output cache when the web page is stored in the output cache and the web page is valid.

13. The system of claim 12, wherein the server is further arranged to:
   render the web page to the browser when the web page is not stored in the output cache; and
   render the web page to the browser when the web page is not valid.

14. The system of claim 12, wherein the output cache manager determines whether the web page is stored in the output cache by matching the cache parameters of the cache profile associated with the requested web page to caching parameters identified in a cache key stored in the output cache.

15. The system of claim 12, wherein the output cache manager is further arranged to:
   generate a cache key for the rendered web page, wherein the cache key identifies caching parameters for the rendered web page; and
   store the rendered web page and the cache key in the output cache.

16. The system of claim 12, wherein the output cache manager determines whether the web page is valid by determining whether the web page was modified after the web page was stored in the output cache.

17. The system of claim 12, wherein the output cache manager determines whether the web page is valid by determining whether the web page was stored in the output cache longer than a predetermined time duration.

18. A computer-readable storage medium having computer-executable instructions for managing an output cache, comprising:
   receiving a request for a web page associated with a website;
   determining a cache profile, wherein the cache profile is separately stored from a web page template of a web page and linked to the web page template via metadata of the cache profile, wherein the cache profile is determined based on the web page hierarchical level location within a website hierarchy of the website, wherein cache parameters of the cache profile and the link between the cache profile and the web page template are modifiable without accessing the web page template;
   determining whether the web page is stored in the output cache based on the cache profile;
   determining whether the web page is valid when the web page is stored in the output cache; and
   returning the web page from the output cache when the web page is stored in the output cache and the output cache is valid.

19. The computer-readable storage medium of claim 18, further comprising:
   rendering the web page from a server when the web page is not stored in the output cache; and
   rendering the web page from the server when the web page is not valid.

* * * * *